(12) United States Patent
Seegel et al.

(10) Patent No.: US 12,246,497 B2
(45) Date of Patent: Mar. 11, 2025

(54) EDGE STABILITY

(71) Applicants: AIRBUS OPERATIONS LIMITED, Bristol (GB); AIRBUS OPERATIONS GmbH, Hamburg (DE)

(72) Inventors: Hauke Seegel, Hamburg (DE); Dominic Bloom, Bristol (GB)

(73) Assignees: AIRBUS OPERATIONS LIMITED, Bristol (GB); AIRBUS OPERATIONS GmbH, Hamburg (DE)

( * ) Notice: Subject to any disclaimer, the term of this patent is extended or adjusted under 35 U.S.C. 154(b) by 517 days.

(21) Appl. No.: 17/557,895

(22) Filed: Dec. 21, 2021

(65) Prior Publication Data

US 2022/0194029 A1 Jun. 23, 2022

(30) Foreign Application Priority Data

Dec. 22, 2020 (GB) ..................... 2020412

(51) Int. Cl.
*B29C 70/54* (2006.01)
*B29K 307/04* (2006.01)
*B29L 31/30* (2006.01)

(52) U.S. Cl.
CPC ........ *B29C 70/545* (2013.01); *B29K 2307/04* (2013.01); *B29L 2031/3076* (2013.01)

(58) Field of Classification Search
CPC .... B29C 2793/0081; B29C 2035/0838; B29C 2035/0211; B29C 2035/0822; B29C 2035/0811; B29C 70/545; B29C 35/0266; B29K 2307/04; B29L 2031/3076;
(Continued)

(56) References Cited

U.S. PATENT DOCUMENTS

2004/0043144 A1 3/2004 Carter et al.
2014/0374002 A1* 12/2014 Lin .................. D06H 7/04
156/497

(Continued)

FOREIGN PATENT DOCUMENTS

CN 103862788 6/2014
CN 211498267 9/2020
(Continued)

OTHER PUBLICATIONS

Combined Search and Examination Report for GB Application No. 2020412.9 dated Mar. 9, 2021, 8 pages.
(Continued)

*Primary Examiner* — Nhat Chieu Q Do
(74) *Attorney, Agent, or Firm* — Nixon & Vanderhye P.C.

(57) ABSTRACT

A method and apparatus for cutting a Non-Crimp Fabric for improving edge stability and reducing stitch retraction is disclosed. The part of the NCF to be cut is treated with a binder and heated to activate the binder and therefore bind the tows and stitches together. By treating only the cutting path the drapability of the wider fabric is maintained. This may be achieved by heating only the part of the NCF to be cut, or applying binder to only the part of the NCF to be cut. The NCF may be compressed and cooled before cutting to improve binding action. A ply cutter may be adapted to carry out the invention by including a heat source and optionally a binder dispenser, compressor and cooler.

7 Claims, 5 Drawing Sheets

(58) Field of Classification Search
CPC ...... B26F 1/382; B26F 1/3813; B26F 1/3826;
B26D 7/10; B26D 7/14
USPC .......................................................... 83/13
See application file for complete search history.

(56) References Cited

U.S. PATENT DOCUMENTS

2019/0030834 A1* 1/2019 Kuroda .................. B29B 11/16
2019/0389148 A1* 12/2019 Wadsworth ....... B29C 66/81451

FOREIGN PATENT DOCUMENTS

| JP | 2018-177624 | 11/2018 |
|---|---|---|
| WO | 93/02242 | 2/1993 |

OTHER PUBLICATIONS

Extended European Search Report for Application No. 21216343.0, dated May 9, 2022, 12 pages.

* cited by examiner

EDGE STABILITY

CROSS RELATED APPLICATION

This application claims priority to United Kingdom Patent Application GB 2020412.9, filed Dec. 22, 2020, the entire contents of which is hereby incorporated by reference.

TECHNICAL FIELD

The present invention relates to a method of cutting a fabric for use as a composite reinforcement in a composite object, as well as a cutter for cutting the same.

BACKGROUND

There is a constant drive in aviation to improve the efficiency of aircraft. Referring now to FIG. 1, a conventional aircraft 1 is shown. The aircraft 1 comprises a fuselage 2, wings 3, an empennage 4, landing gear 5 with its associated landing gear bay doors 6 and engine nacelles 7. Conventionally, all or most of the structure of such an aircraft, from the structural members such as wing spars and ribs through to aerodynamic surfaces such as wing skins and control surfaces, would be made of metal. By substituting composite objects for metal parts substantial weight savings can be achieved.

Composite parts are made using a combination of reinforcement and matrix, most commonly in aerospace being carbon fibre reinforcement and a resin matrix. Composite objects are often made by using woven sheets of reinforcing fibres. Such woven sheets are particularly suitable for making substantially flat composite objects. The woven sheets are easy to handle and can be simply cut to an appropriate shape. However, such composite materials are less suitable for use in some aerospace applications, since the reinforcing fibres are crimped against each other in the weaving process. This crimping reduces the strength of the object compared to an object made using straight fibres. Furthermore, aircraft components often feature highly curved surfaces which can be challenging to make with woven sheets since they are not very drapeable.

Non-Crimp Fabrics (NCFs) may be used instead of woven sheets where high performance and/or high drapability are required. Referring to FIG. 2, a schematic of such a prior art NCF 10 is shown. This NCF has a first ply of parallel fibre tows 11 on top of a second ply of parallel fibre tows 12 oriented perpendicular to the first ply 11. The two plies are held together loosely by stitching 13. Since the fibres each tow in this NCF are substantially parallel, a composite object made with this as reinforcement will generally have a higher strength (and other desirable properties) than one made with a woven sheet reinforcement. Furthermore, since the tows 11, 12 within the NCF 10 are not crimped they can more easily slide adjacent to each other, resulting in a highly drapeable fabric suitable for making complex shapes typical in some aerospace applications.

A problem with NCFs arises when cutting them to an appropriate shape for the composite object to be made. The same features which make the NCF so drapeable mean that the material may suffer from a lack of edge stability once cut. Stitch retraction and fibre fraying can lead to a "brush" edge where fibre orientation is no longer controlled. Previous attempts to address this issue have included denser stitching on the NCF, but this normally results in reduced drapability. It would be desirable to provide a way of providing a cut sheet of NCF that maintained high drapability with improved edge stability.

SUMMARY

A first aspect of the present invention provides a method of cutting a fabric, the fabric comprising a binder, the method comprising: identifying a cutting path on the fabric; activating the binder along the cutting path by heating the fabric; and cutting the fabric along the cutting path.

By activating the binder along the cutting path, those parts of the fabric which are to be cut will have improved adhesion between the fibres and stitches of the fabric, thereby improving edge stability and/or reducing the tendency of the edge to fray or the stitches to retract.

Optionally, the binder in the fabric is provided by dispensing binder onto the fabric along the cutting path. This avoids undesirable binding of the fabric outside of those areas proximate to the edges of the cut fabric to maintain the drapability of the fabric in the event that the fabric away from the cutting path becomes hot enough to at least partially activate the binder.

Optionally, the binder is activated along the cutting path by heating the fabric along the cutting path. Accordingly a fabric that has been more completely treated with binder may be used without undesirable activation of the binder away from the cutting path.

Preferably, the method further comprises compressing the fabric along the cutting path before the step of cutting. This can improve the binding action of the activated binder.

Optionally, the fabric is compressed by passing a roller over the fabric. A roller allows the fabric to be compressed without significant lateral forces being imposed on the fabric, which may reduce the possibility of the fabric slipping.

Optionally, the fabric is compressed by a foot that slides over the fabric. Although this exposes the fabric to more lateral force a foot is very suitable for exerting pressure over a significant area which may be desirable to ensure good binding of the fabric.

Optionally, the method further comprises a step of cooling the fabric before the step of cutting the fabric. This ensures that the binder is "set" and avoids slippage of the fibres or stitches in the fabric.

Optionally, the fabric is heated by exposure to an infra-red light source. Infra-red light is very suitable for heating the fabric and provides an effective way to limit the area of the fabric heated if that is desirable.

Optionally, the fabric is heated by a resistive heating element. A resistive heating element is particularly suitable for heating larger areas of a fabric simultaneously, which may be desirable if each part of the fabric is to be heated for a significant time such that the heating step takes longer than the cutting step.

Optionally, the step of cutting the fabric is carried out using a reciprocating knife.

Alternatively, the step of cutting the fabric is carried out using a rotary knife.

Preferably, the activating and cutting steps are carried out by an automated ply cutter. Although the method may be implemented in a purely manual way, an automated ply cutter that can activate the binder whilst cutting the fabric minimises the chances for any slipping of the fabric as the shape is being cut.

A second aspect of the present invention provides a ply cutter for cutting a Non-Crimp Fabric (NCF) sheet; the ply cutter comprising: a bed for supporting a NCF sheet comprising a matrix of resistive heating elements for heating at least a region of a NCF sheet disposed on the bed; a knife unit comprising a cutter, moveable over the bed along a cutting path for cutting a NCF sheet disposed thereon; and a roller coupled to the knife unit for compressing a region of a NCF sheet disposed on the bed along the cutting path.

Such a ply cutter may be well suited for cutting large pieces of NCF since the heated bed will permit the activation of the binder across a large area of the fabric before it is cut. The use of a roller provides adequate compression force to aid the binding action of the binder whilst minimising the chance of slipping.

A third aspect of the present invention provides a ply cutter for cutting a Non-Crimp Fabric (NCF) sheet, the ply cutter comprising: a bed for supporting a NCF sheet; and a knife unit, moveable over the NCF sheet disposed on the bed for cutting the NCF sheet along a cutting path; the knife unit comprising: a cutter for cutting the NCF sheet; an infra-red light source arranged in front of the cutter for heating the NCF sheet prior to it being cut by the cutter; and a foot arranged in front of the cutter for compressing the NCF sheet prior to it being cut by the cutter.

Such a ply cutter may be well suited for cutting NCF that does not need a high temperature for activating its binder since the infra-red light source is well suited for heating the fabric to lower temperatures, and the use of a foot helps to compress the fabric to promote good binding.

In either the second or third aspect of the present invention, the ply cutter may further comprise a binder dispenser for dispensing binder on the NCF sheet along the cutting path. This avoids the presence of binder across the rest of the NCF sheet, which may be desirable.

BRIEF DESCRIPTION OF THE DRAWINGS

Embodiments of the invention will now be described, by way of example only, with reference to the accompanying drawings, in which:

FIG. 6 is a schematic view of the foot illustrating the fabric in a compressed form.

FIG. 7 is a schematic view of the ply cutter of FIG. 4 illustrating the compressed sheet.

DETAILED DESCRIPTION

Figure 3:
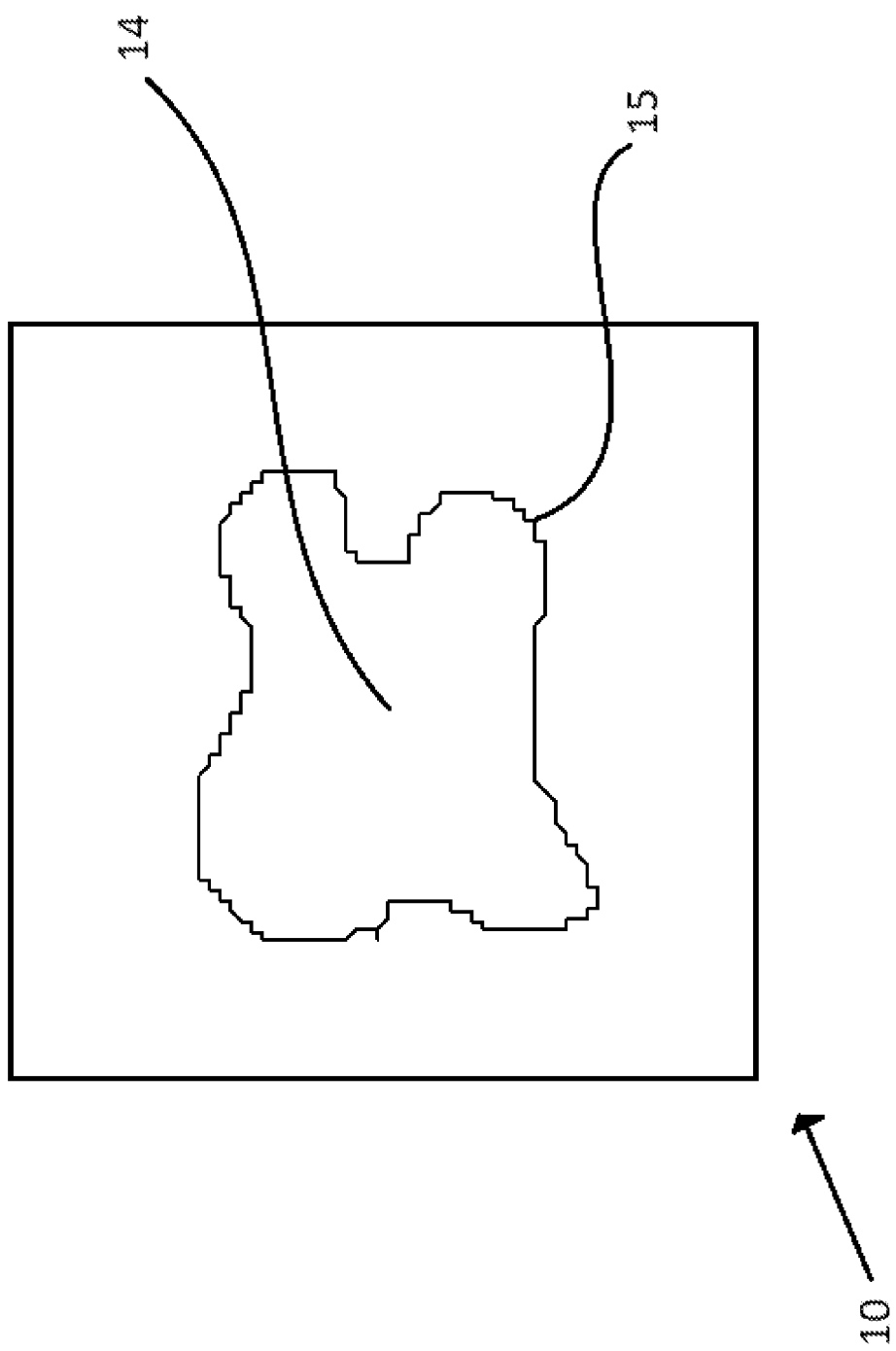
FIG. 3 shows a potential irregular cutting path along an NCF.

With reference to FIG. 3, a shape 14 to be cut out of a NCF sheet 10 is shown. This is a generic shape but it should be understood that the shape 14 may represent the desired shape of an aerospace component. In order to cut out this shape 14 from the fabric 10 then the fabric will need to be cut around the perimeter of the shape 14—cutting path 15. This may be done using a ply cutter, where the fabric 10 is laid on the cutter and a knife follows the cutting path 15 along the edges and around the periphery of the shape 14 to cut it out. Seeing as some of the edges will be at shallow angles relative to the fibre orientation in at least some plies or locations around the shape, this shape is likely to experience a significant amount of stitch retraction, fibre fraying and other such issues leading to a degraded edge.

According to the present disclosure, a new method of cutting the fabric is provided. The method comprises providing an NCF sheet 10 comprising a binder. The binder is present in the fabric in an inactive form, where it does not bind the tows, stitches or fibres. A cutting path 15 is then identified to be cut into the fabric around the shape corresponding to a desired shape to be cut. The binder is then activated along the cutting path 15. This may be by heating the fabric along the cutting path, or alternatively by using fabric comprising binder only along the cutting path 15 and heating the whole of the fabric 10 more generally (of course, just the cutting path 15 could be heated once more). Fabric comprising binder only along the cutting path 15 can be obtained by, for example, dispensing the binder in a solvent along the cutting path 15. The fabric 10 is then cut along the cutting path 15 to yield the desired shape 14.

The binder selected for use with the techniques of the present disclosure could be anything capable of providing adhesion between the fibre tows and/or stitches. The binder should be compatible with the resin that is to be infused into the fabric but may be a "black box" i.e. unknown material supplied by the fibre and resin supplier. Examples include epoxy-based binders, thermoplastics such as polyester and polyamide 6. The skilled person will realise that any other suitable binder may be used.

By activating the binder, the fibre tows around the cut edge are at least partially adhered to each other by action of the binder. Activation of the binder will result in adhesion between the plies 11, 12 that improve edge stability, and may be done without rendering the edge of the shape fully rigid. Since the activation is localised at to the edges of the cut shape, the general formability of the fabric as a whole is preserved. Furthermore, since the binder is activated before cutting, the stitches 13 will also be at least partially bound to the tows in the fabric 10 by the binder, reducing the tendency of the stitches to retract as soon as they are cut and further improving edge stability.

The temperature to which the fabric 10 and binder should be heated depends on a variety of factors, such as the binder chosen (different binders have different activation temperatures), the depth within the fabric to which it is desirable to activate the binder (deep activation implies a need for higher temperatures) and how much of the binder it is desirable to activate (going substantially above the activation temperature for a sustained period of time will activate most of the binder). One option is to heat the fabric 10 to the activation temperature of the binder and then the heating is immediately removed (or moved on) to perform a minimal activation that provides increased stability whilst minimising impact on drapability. Alternatively, the fabric 10 may be heated to approximately 10 degrees Celsius or 20 degrees Celsius above the activation temperature of the binder to ensure a more complete activation of the binder. Commonly used binders are usually activated at temperatures in the region of 80-140 degrees Celsius (and future binders may activate at lower temperatures in the region of 60 degrees Celsius). However in the case of polyester veils or epoxy-based powder binders, both would be heated to approximately 120 degrees Celsius. The temperatures listed here are necessarily somewhat approximate and are rounded to the nearest 10 degrees Celsius.

The increase in edge stability provided by this method can be further improved by compressing the fabric along the cutting path. This step is preferably carried out after the heating of the fabric and before or during the cutting of the fabric. Compressing the fabric improves the ability of the binder to bind the tows and stitches together to achieve the improved edge stability. Furthermore it may reduce the amount of heat that must be provided to the fabric by ensuring good binding only along the cutting path 15, minimising the amount of binder that will be activated by the heating near the cutting path 15 and preserving the drapability of the fabric.

It may be desirable to ensure that the binder has cooled below its activation temperature before or during the cutting of the fabric, therefore ensuring that the binding action provided is "set" and to minimise any slippage of stitch or fibre. Although this can be achieved by simply waiting (assuming ambient temperatures are low enough) the process can be sped up by cooling the fabric e.g. by action of a fan. Accordingly the method may comprise step of cooling the fabric before or during the cutting of the fabric.

The method can be used on fabric that incorporates a binder, or on a fabric without any binder by including a step of dispensing or applying binder to the fabric before it is cut. This is preferably before the fabric is heated to enable the binder to be heated directly by the heating step, rather than indirectly by the heated fabric. The binder could be provided in any appropriate way, such as in a solvented spray or as a powder, film or veil. In each case the binder could be applied only along the cutting path or alternatively across significantly more of the fabric, since only after being activated will the binder have a binding effect. The binder could be applied loosely to the fabric or otherwise attached to the fabric, for example a veil or film stitched to the top layer of the fabric or a mild adhesive or tack agent being used to inhibit movement of the binder.

Accordingly a shape cut out from a fabric by the method described above will have improved edge stability and reduced stitch retraction, and can then be used as the reinforcement component in a composite object. This method may be carried out by adapted ply cutters according to embodiments of the present disclosure as described below.

Figure 4:
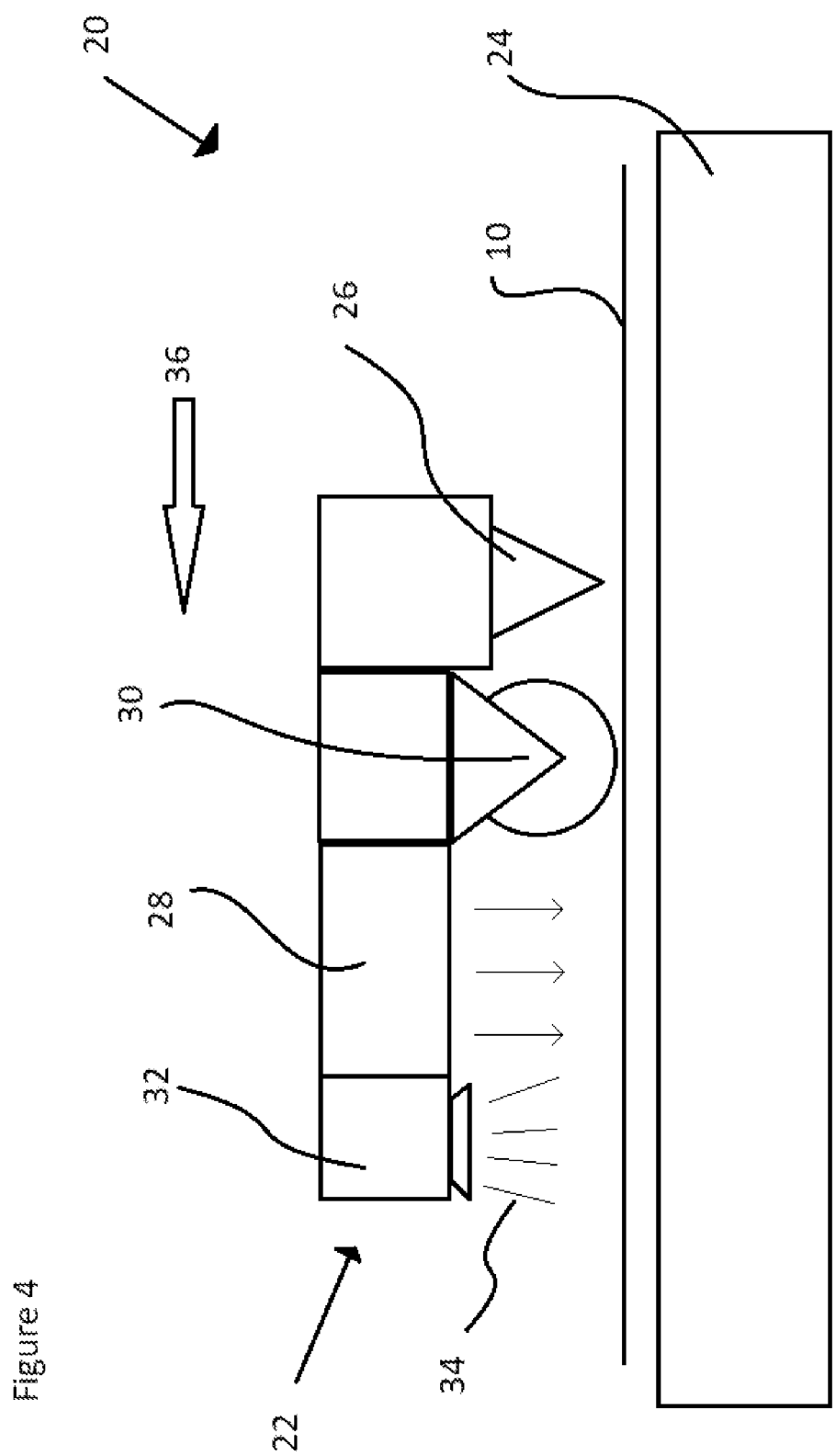
FIG. 4 is a schematic of a potential ply cutter.

According to a first embodiment of the present disclosure and with reference to FIG. 4, a schematic of a potential ply cutter 20 for implementing the method described above is shown. The ply cutter 20 comprises a knife unit 22 which may be moved by positioning arms (not shown) or similar in order to cut a fabric 10 laid on a ply cutter bed 24. The bed 24 serves to support the fabric 10 during cutting and is generally flat and horizontal to avoid movement of the fabric 10. In use an NCF sheet 10 is unrolled and placed on the bed 24.

Referring again to knife unit 22, it comprises a cutter 26 being a reciprocating knife for cutting the fabric 10 in the conventional way. The positioning arms allow the cutter to be moved over the bed 24 along a cutting path for cutting the fabric placed on the bed 24. The knife unit 22 further comprises a local heating unit 28, in this embodiment being an IR lamp arranged to shine on the bed along the cutting path for heating the fabric 10 before it is cut. The knife unit 22 is shown comprising an optional roller 30 as a pressure source to apply pressure to the fabric 10 immediately after heating to help activate the binder as described above.

The knife unit may further comprise a dispenser 32 for dispensing binder 34 onto the fabric 10. Preferably, the dispenser 32, IR lamp 28 and roller 30 are arranged in that order before the cutter 26 so that as the knife unit 22 moves in a direction of travel 36 the fabric 10 first receives binder 34 from the dispenser 32, before being heated by the IR lamp 28 to activate the binder, which is then compressed by roller 30 to improve binding along the cutting path before the fabric is cut by the cutter 26.

The knife unit 22 may further comprise a cooling unit being a fan (not shown) for cooling the fabric as the knife unit 22 moves across the fabric 10. Preferably, the cooling unit is arranged after the roller 30 and before the cutter 26 so that maximum adhesion is achieved by the binder before it is cooled below the activation temperature and the binder is "set" before the fabric is cut to minimise stitch retraction.

Figure 5:
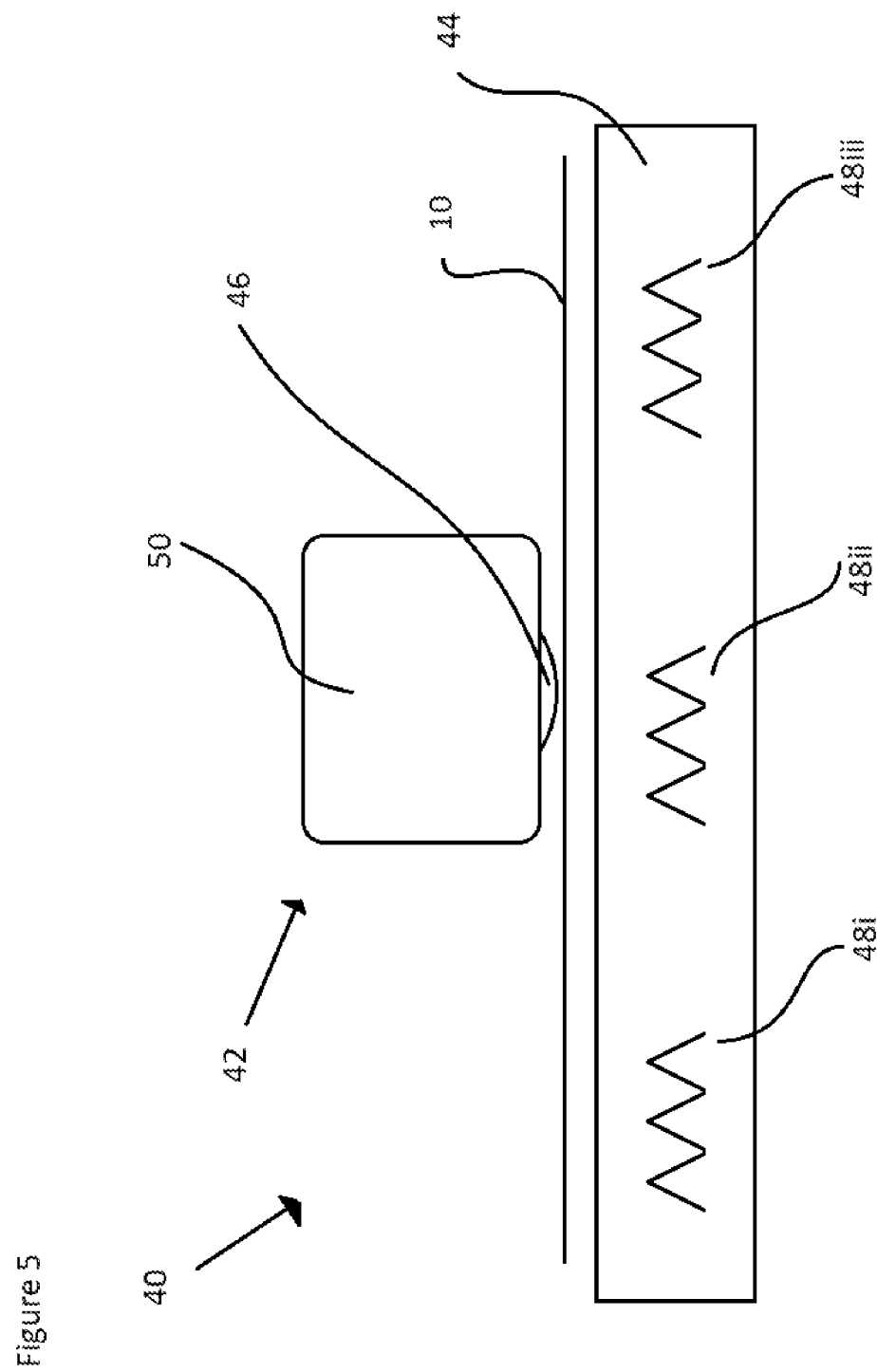
FIG. 5 is a schematic of an alternate ply cutter.

According to a second embodiment of the present disclosure and with reference to FIG. 5, a schematic of an alternate ply cutter 40 is shown. The ply cutter 40 again comprises a knife unit 42 which may be moved by positioning arms (not shown) in order to cut a fabric 2 laid on a ply cutter bed 44. The knife unit 42 comprises a cutter 46 being a rotary cutter. In this embodiment, the local heating unit is implemented by a matrix of resistive heating elements 48*i*, 48*ii*, 48*iii* . . . which are part of the bed 44. These resistive heating elements 48 may be individually activated to heat the bed, and hence the fabric, along the cutting path to activate a binder. In alternative embodiments the resistive heating elements 48 may activated as a whole with or without the capability of being individually activated where binder is to be dispensed or applied to the fabric 10 along only the cutting path. Since the fabric is heated less directly in this embodiment it is more desirable to also compress the fabric against the bed to promote heat transfer and binder activation.

In order to compress the fabric 10 the knife unit 42 comprises a foot 50 which surrounds the rotary cutter 46 and is biased by a spring or similar against the fabric 10. In one mode of use, as the knife unit moves over the fabric along the cutting path the heating elements 48 are activated in turn in front of the knife unit 42 to heat the fabric 2, which is then compressed by the foot 50 before being cut. In the case that the foot is symmetric about the rotary cutter 46, the fabric would continue to be compressed by the foot 50 until the knife unit 42 had passed. A knife unit 42 with a symmetric foot might be desirable since it could be used to cut the fabric 10 when moving in either direction.

The knife unit 42 of the second embodiment could also be adapted for use with a dispenser for dispensing binder on the fabric. A further alternative way of using the second embodiment ply cutter 40 would be to activate all of the heating elements 48 along the cutting path before beginning to cut the fabric 10, which might be desirable to allow heat to penetrate the fabric 10 more fully and provide a stronger activation of the binder. Further alternatively, the whole of fabric 10 could be heated by the heating elements 48, with the binder being dispensed along the cutting path to ensure binding is provided only where it is needed.

Although in the two embodiments above describe generally applying heat and pressure in-line with the knife unit and just before the fabric is cut by the cutter, in other embodiments heat could be applied along the cutting path to the fabric before any cutting begins. This would allow the approach identified here to be used with existing ply cutters by heating the fabric with e.g. a handheld IR lamp or potentially by an automated IR laser. Such a pre-heating step might be desirable where knife unit speeds are too high to provide satisfactory activation of the binder. Compression could, if desired, then be applied via a pressure source on the knife unit or alternatively by a separate pressure source. In the case of a highly manual process, a heated roller or handheld heat source+pressure source could be used to trace over the cutting path prior to cutting.

A variety of heat sources have been described in relation to different embodiments above. The skilled person will realise that any one of these options could be used in an improved ply cutter as described above, or in a manual process. Resistive heating, IR heating, induction heating or laser heating may be appropriate for different applications and could be applied to the fabric sitting on a ply cutter bed; on a separate surface before being moved into position; or simply on an appropriate cutting surface if the fabric is to be manually cut. When "heating the fabric" is discussed it refers to the fabric comprising a binder, so the binder and fabric are both heated together. In the case of a binder in the form of a veil stitched to one side of the fabric, heat could be applied to the binder-bearing side but this would still result in the fabric as a whole being heated.

A variety of pressure sources have been described above and again could be used as alternatives for each other in either of the ply cutters described or in a manual process. Rollers, pressing foots or ultrasonic sonotrodes may all be used in different applications, or omitted entirely if not needed. The pressure source may be pressed into the fabric and dragged, rolled or slid along the cutting path, or alternatively may simply be repeatedly pressed into the fabric along the cutting path.

A variety of cooling sources could be used to cool the fabric and binder below the activation temperature. For example, the ply cutter bed or another cutting surface could be chilled by a peltier effect cooler (which could also have been used as a heat source in the first instance) or any conventional cooling means such as having channels for a coolant. Apart from simple fans to provide convection cooling chilled air could be passed over/under the fabric for more rapid cooling. In the case where the binder is applied to the fabric with a solvent, evaporation of the solvent may provide sufficient cooling to drop the temperature below the activation temperature.

The optimal order for treating the fabric described above is first to dispense binder on the fabric (if necessary), before heating, optionally compressing, optionally cooling and then cutting the fabric. However, a different order of treatments (and therefore of components in a knife unit 22 as shown in FIG. 4) may still provide some improvement in edge stability of the cut fabric. For example, heating could be carried out before the dispensing step. Alternatively, heating could be carried out after the compression step.

Figure 1:
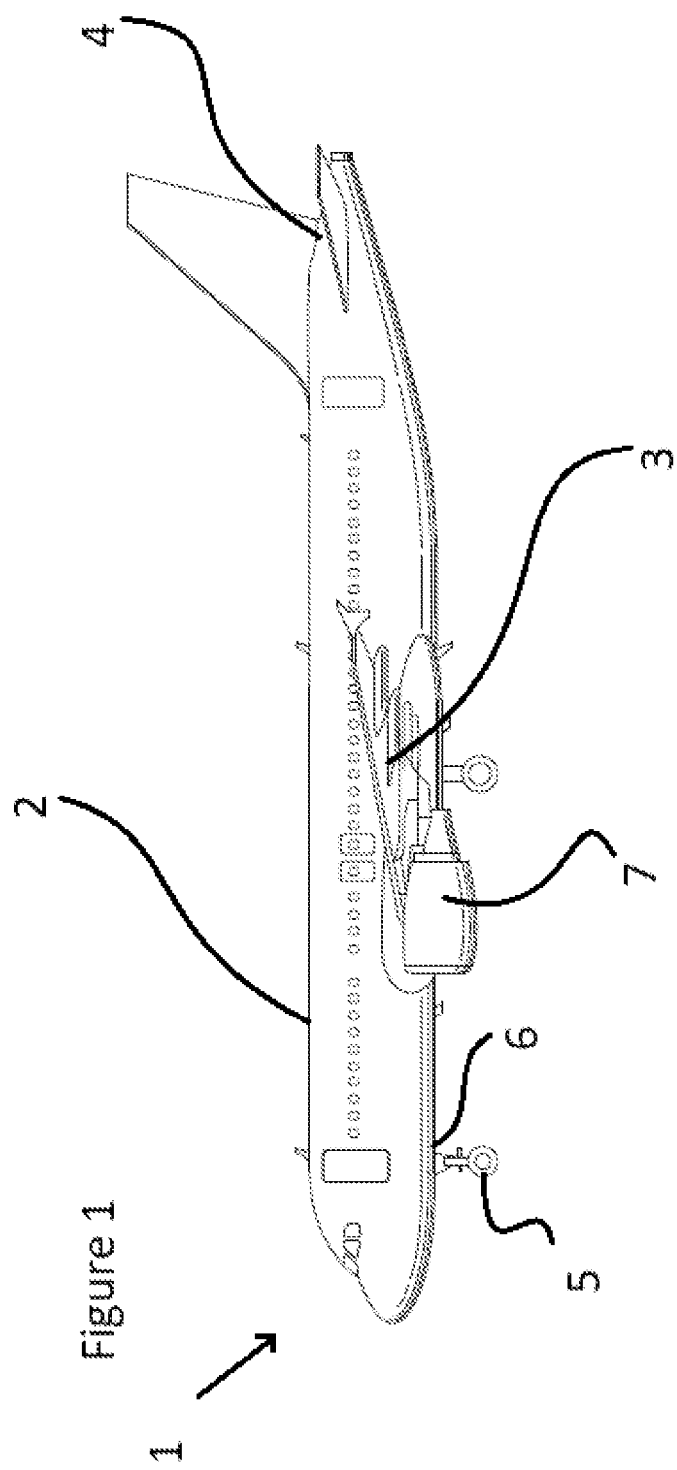
FIG. 1 is a perspective view of a conventional aircraft.
Figure 2:
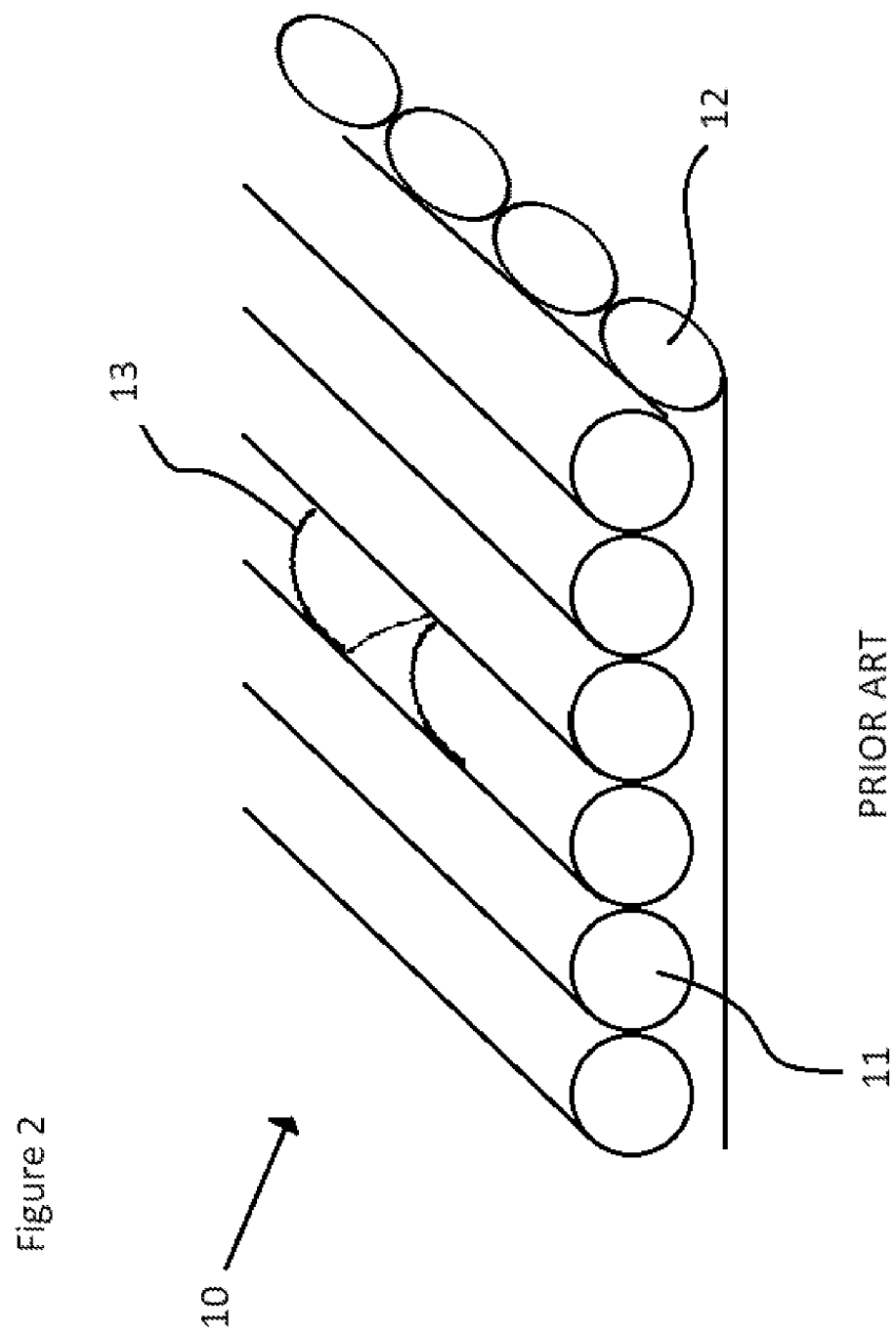
FIG. 2 is a schematic of a prior art NCF.

Although FIG. 2 depicts an NCF with two plies of reinforcing fibre tows it will be appreciated that the invention could be applied to NCF with any number of plies, adjusting heat, heating time and pressure such that sufficient binder activation is realised. Although conceived of in the field of carbon fibre NCFs and resin binders, the skilled person will realise that the techniques described herein can be used with any NCF and binder combination where the binder can be activated by heat.

Although the invention has been described above with reference to one or more preferred examples or embodiments, it will be appreciated that various changes or modifications may be made without departing from the scope of the invention as defined in the appended claims.

Although the invention has been described above mainly in the context of a fixed-wing aircraft application, it may also be advantageously applied to various other applications, including but not limited to applications on vehicles such as helicopters, drones, trains, automobiles and spacecraft.

Where the term "or" has been used in the preceding description, this term should be understood to mean "and/or", except where explicitly stated otherwise.

The invention claimed is:

1. A method of cutting a fabric using an automated ply cutter, the fabric comprising a binder, and the automated ply cutter comprising a dispenser, a local heating unit, a pressure source, and a cutter, the method comprising:
   identifying a cutting path on the fabric and moving the automated ply cutter along a cutting path, wherein the step of moving the automated ply cutter along the cutting path comprises:
   using the dispenser to dispense binder onto the fabric along the cutting path;
   using the local heating unit to activate the binder along the cutting path by heating the fabric; and
   using the pressure source to compress the fabric along the cutting path; and
   using the cutter to cut the fabric along the cutting path;
   wherein the cutter, the pressure source, the heating unit, and the dispenser are positioned in sequence with respect to a direction of travel of the automated ply cutter.

2. A method according to claim 1, wherein the pressure source is a roller and the fabric is compressed by passing the roller over the fabric.

3. A method according to claim 1, wherein the pressure source is a foot and the fabric is compressed by the foot that slides over the fabric.

4. A method according to claim 1, further comprising a step of cooling the fabric before the step of cutting the fabric.

5. A method according to claim 1, wherein the local heating unit is an infra-red light source and the fabric is heated by exposure to the infra-red light source.

6. A method according to claim 1, wherein the cutter is a reciprocating knife.

7. A method according to claim 1, wherein the cutter is a rotary knife.

* * * * *